June 29, 1965  A. A. A. ERIKSSON  3,191,449
REVERSING DEVICE FOR USE PRIMARILY
IN SCREW THREAD CUTTING DEVICE
Filed Oct. 11, 1962  3 Sheets-Sheet 3

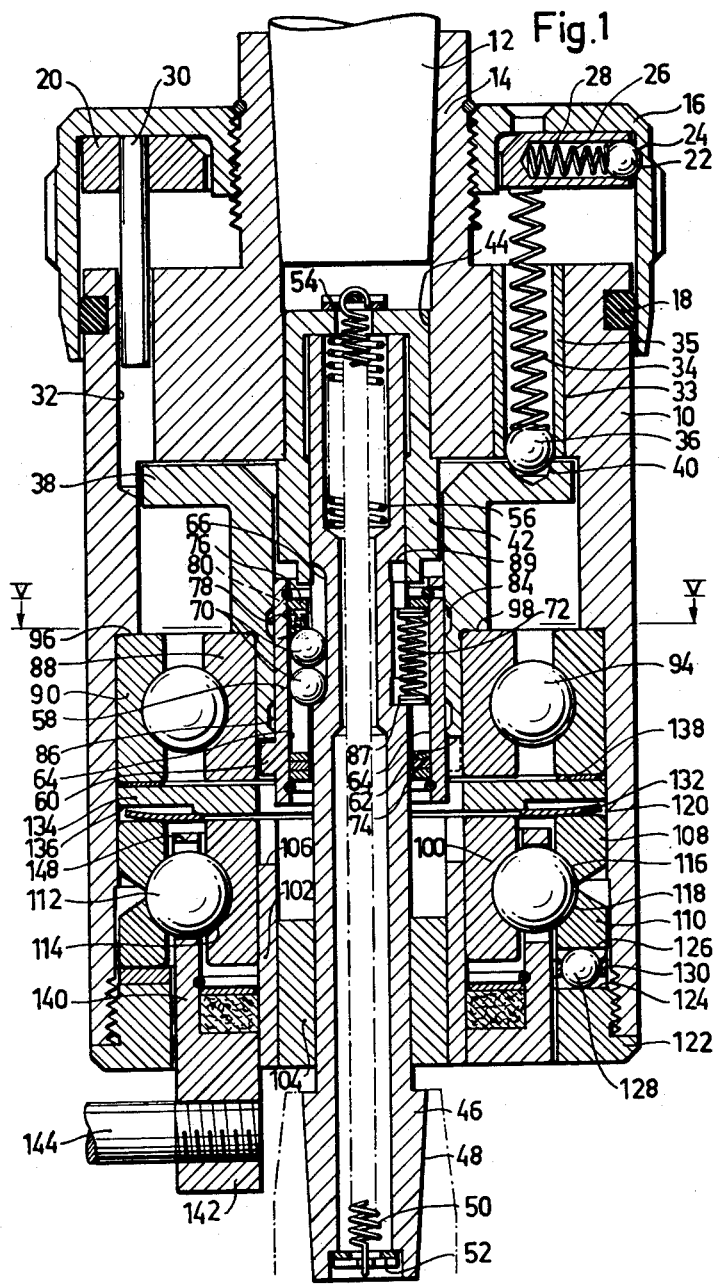

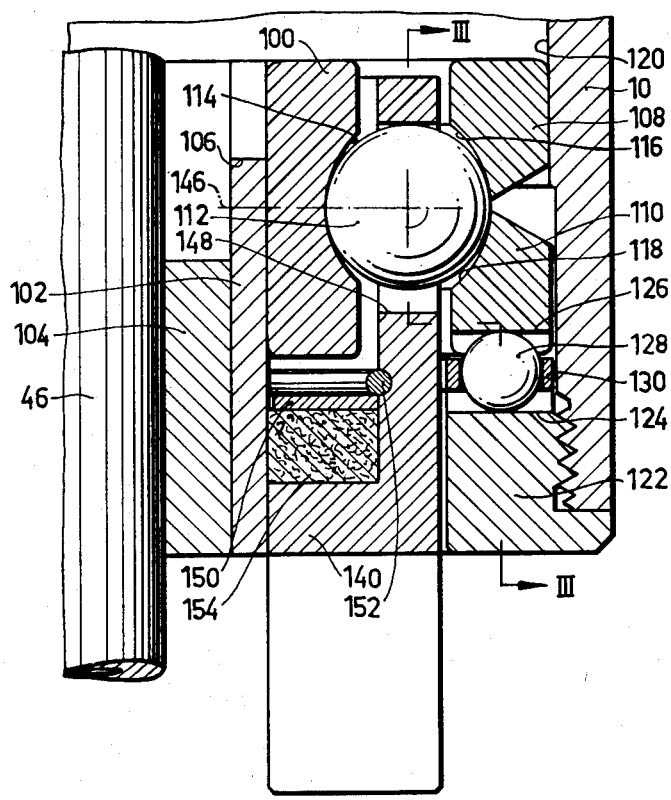
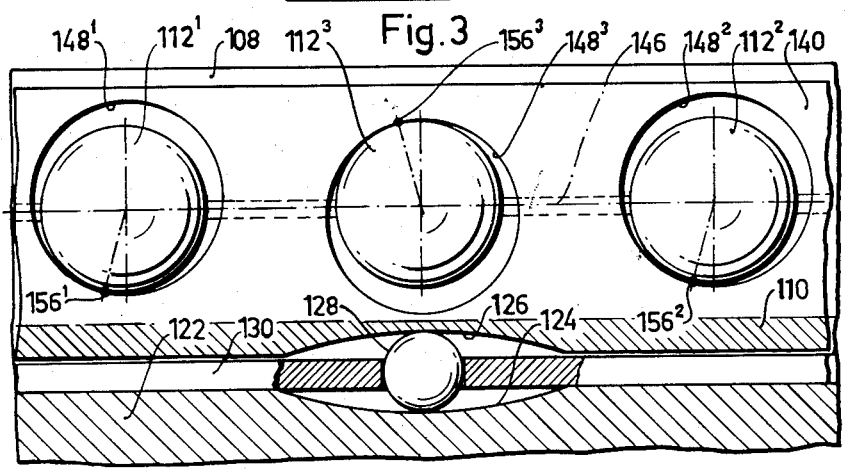

INVENTOR.
ALF ANDERS ANSELM ERIKSSON
BY
ATTORNEY

United States Patent Office 3,191,449
Patented June 29, 1965

3,191,449
REVERSING DEVICE FOR USE PRIMARILY IN SCREW THREAD CUTTING DEVICE
Alf Anders Anselm Eriksson, 92 Altavagen, Nacka, Sweden
Filed Oct. 11, 1962, Ser. No. 229,957
Claims priority, application Sweden, Oct. 11, 1961, 10,100
9 Claims. (Cl. 74—202)

This invention relates to a reversing device.

More particularly this invention relates to a reversing device of the type the main application of which is in screw thread cutting apparatus.

Still more particularly this invention relates to a reversing device in an apparatus, such as a screw thread cutting apparatus, comprising a driving part and a part driven by said driving part in either direction. For reversing the direction of rotation the two parts are provided with concentrical ring members formed with opposed raceways for intermediate torque transmitting rolling bodies maintained stationary by means of a rolling body cage with respect to rotation about the centre axis of the apparatus.

In the Patent No. 3,037,393 granted June 5, 1962, to J. Bernhard it is disclosed to automatically apply such rolling bodies against the raceways with a variable pressure in order for these bodies to be capable of transmitting a torque adapting itself to the resistance against the reversing produced by the driven part. According to the disclosure in said patent the application is effected by an axial pressure transmitted through the rolling bodies between the two ring members which pressure is varied by means of a wedge coupling having inclined rolling ways for rolling bodies.

One main object of the present invention is to provide a reversing device for an apparatus of the type in consideration, primarily a screw thread cutting apparatus which can be made compact and with a small axial dimension.

Another object of the invention is to provide a reversing device which has a low operating temperature and which only requires a minimum of lubrication due to the absence of sliding friction in the torque transmitting surfaces.

Further objects and advantages of the invention will become apparent from the following description, considered in connection with the accompanying drawings, which form part of this specification, and of which:

FIG. 1 is an axial sectional view of a screw thread cutting apparatus constructed according to the invention.

FIG. 2 is the same sectional view on a larger scale of a portion of the apparatus.

FIG. 3 is a sectional view of a portion of the reversing device taken along line III—III of FIG. 2 and flattened in plan.

Figure 4:
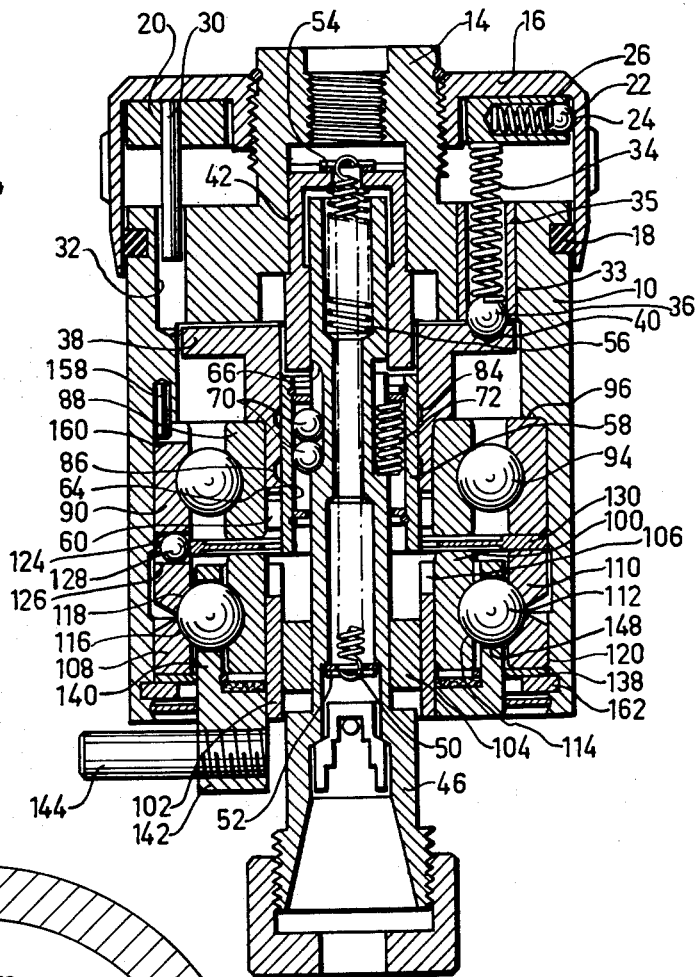
FIG. 4 is an axial cross-sectional view of another embodiment of the invention.
Figure 5:
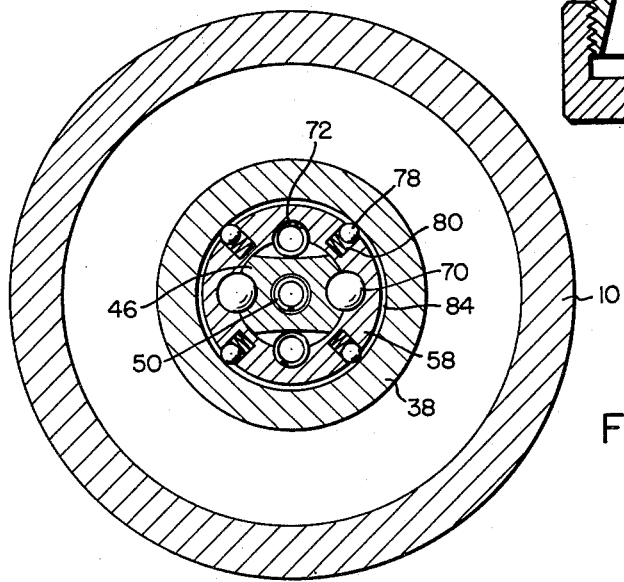
FIG. 5 is a sectional view taken along the line V—V in FIG. 1 looking in the direction of the arrows.

Referring to the embodiment shown in FIGS. 1 to 3, reference numeral 10 denotes a driving part of the apparatus which is connected at the top to a drive spindle 12 intended to be secured in a tool machine, for example. Screwed on the upper, narrower neck 14 of the part 10 is a sleeve 16 which extends over the part 10 and is sealed against this part by means of a sealing ring 18. An annulus 20 is disposed in the sleeve 16. Disposed between these two elements is a detent means comprising a ball 22, which projects into a cup-shaped recess 24 formed in the sleeve 16, and a spring member 26 positioned behind ball 22 in a radial bore 28 formed in the annulus 20. Several such detent means may be spaced circumferentially of the sleeve. The annulus 20 serves as a holder for a pair of axially directed, diametrically opposed and preferably hollow guide pins 30 extending into axial bores 32 formed in the driving part 10. In the greater number of axial bores 33 in the part 10, which bores may be lined with sleeves 35, spring members 34 are disposed which bear at one end against the annulus 20 and at the other end against balls 36. The pins 30 prevent the ring or annulus 20 from turning in relationship to the part 10. The detent means 22, 26 in turn prevents the sleeve 16 from accidentally rotating relative to the part 10. Thus the sleeve must be subjected to a torque which forces the ball 22 out of the recess 24 against the action of the spring member 26 in order that the sleeve 16 be able to perform a turning movement by which the ring 20 is axially displaced, and thus a change of the tension of the springs 34 is produced. Each time the ball 22 snaps into a recess 24 a rattling sound is produced whereby the size of the turning movement and thus the change of the tension of the spring members 34 may be registered from outside to some extent.

Together with a sleeve-shaped element 38 the balls 36 form a coupling device transmitting the torque between the driven part and the driving part 10. The balls 36 engage cup-shaped recesses 40 formed in the element 38 out of which they roll while compressing the spring members 34 when a torque determined by the spring members 34 is exceeded.

A bush 42 is rigidly secured to the driving part 10 in a central bore 44 formed in said part. The driven part 46 of the thread cutting device extends from the underside of the part 10 up into the bush 42 which here centers the part 46. The part 46 is generally tubular and has a tapered lower portion 48 for attachment of a screw tap holder. The part 46 is suspended in the part 10 by means of a long spring member 50 secured at the lower end of the part 46 by means of a slip washer 52 and at its top in a slip washer 54 positioned above the bush 42. The slip washers 52 and 54, which may be of plastic material such as nylon, permit relative motion of the parts 10 and 46 without the spring member 50 being subjected to undue rotation. A further spring member 56 having a larger diameter is disposed in the top portion of the part 46 and bears at one end against part 46, and at its opposite end against the internal side of the top of the bush 42. This spring member is compressed when the part 46 approaches said top.

In direct drive the torque is transmitted between the parts 10 and 46 through the detent coupling 36, 38 and also through a second coupling comprising a sleeve 58 provided with dogs 60, which are suitably two in number and diametrically opposed and to which notches 62 formed in the coupling element 38 correspond. The sleeve 58 has a number of circumferentially spaced axial grooves 64, for instance four, having semi-circular cross-sectional shape; and four grooves 66 of the same shape are formed in the part 46 registering with said first-mentioned grooves. In two opposed pairs of grooves 64, 66 balls 70 are disposed; and in the two others spring members 72 are disposed. The balls 70 do not permit any rotational relative movement between the sleeve 58 and the part 46 but they permit axial relative movement between the members, said movement being bounded by locking rings 74, 76 mounted adjacent opposite ends, respectively, of the sleeve 58. The spring members 72 bear against one of the ends of the grooves 66 and against the locking ring 74 or 76, whichever the case may be, as will be seen from the following explanation.

The sleeve 58 has two index positions, one upper position at direct drive and a lower position at reverse drive. The sleeve is retained in one or the other of these two positions by means of a detent comprising a ball 78 which is pressed into either of two axially-spaced annular grooves 84, 86 formed in the sleeve element 38, by means of a spring member 80 inserted into a radial bore formed in the sleeve 58. In the position shown in FIG. 1 the dogs 60 of the sleeve 58 engage the notches 62 of the sleeve element 38, for which reason a direct drive torque transmisson is effected between said parts. The ball 78 is in the upper groove 84. The spring members 72 are partly compressed between their end abutments, which are the lower ends 87 of two of the grooves 66 and the locking ring 76. If the driving part 10 for reversing the direction of rotation of the driven part 46 is moved upwards in relationship to the driven part 46, the sleeve element 38 and the sleeve 58 are brought along. During a first stage the balls 70 roll in their grooves and the spring members 72 are relieved. When said spring members, during the continued axial relative movement between the parts 10 and 46, meet the locking ring 74 with their lower ends and contact the upper ends 89 of the associated grooves 66 with their upper ends, the spring members 72 are compressed once more so as to cause an axial force to be accumulated which is large enough to move the ball 78 out of the groove 84 against the action of the spring member 80. The sleeve 58 now snaps down so as to cause the ball 78 to enter instead the lower groove 86 in the sleeve element 38, thus reversing the drive to the driven spindle 46.

Return to the position of direct drive is effected by an analogous change of the abutments engaging the springs 72. The tension spring member 50 then pulls the spindle 46 inwards, so that the sleeve 58 snaps to the position for direct drive. The action causing the ball 78 to be pressed back into its bore may also be initiated by the balls 70 pressing against the locking ring 74 or 76 thereby enforcing the switching of the sleeve.

A ball bearing is disposed concentrically around and centers the sleeve element 38, the inner ring 88 of said bearing being mounted on said element and its outer ring 90 being mounted in the part 10. Balls 94 are adapted to co-operate with raceways formed in the two rings 88 and 90, so as to cause the bearing also to maintain the sleeve element 38 in an axial position in relation to the part 10. This part 10 has a shoulder 96 against which the outer ring 90 bears. The inner ring 88 bears against a shoulder 98 formed on the sleeve element 38. As is seen from the figures, the recesses 62 in the bottom of the sleeve element 58 extend axially, and lie within the inner ring 88 to accommodate the projections 64 on sleeve 58 when the apparatus is set for forward or direct drive.

The inner ring 100 of a radial ball bearing serving for the reversing operation is slidably carried on the driven part 46 together with two sleeves 102 and 104. The sleeve 102 is provided with notches 106 fitting the dogs 60 of the sleeve 58, said dogs thus engaging these notches when the sleeve is in its reversing position according to the description hereinbefore. Disposed concentrically outside the bearing ring 100 is an outer bearing ring made in two parts 108, 110. Between the bearing rings a row of rolling bodies is positioned, said bodies in the embodiment shown being balls 112 co-operating with a grooved raceway 114 formed on the inner ring 100. The two part-rings 108, 110 have raceways 116 and 118, respectively, which together have a groove in correspondence with the raceway 114. As shown in FIG. 2 in an exaggerated scale, the raceways exhibit in cross-section a slightly larger radius of curvature than the balls 112. The part-ring 108 is centered by the cylindrical internal face 120 of the driving part 10. The part-ring 110 is formed with a clearance with the same face.

A ring 122 screwed into the lower portion of the part 10 is provided in its inner face with a number of cup or wedge shaped recesses 124 spaced angularly around the ring. The part-ring 110 is formed with cup or wedge shaped recesses 126 of a corresponding shape and number, and between these recesses 124 and 126 balls 128 are provided which are guided by a ball cage 130. When the ring 122 rotates relative to the part-ring 110 the balls 128 roll up on the ends of the recesses 124, 126, which causes the part-ring 110 to be axially displaced towards the balls 112. At the same time the centered part-ring 108 is axially displaceable against the action of an annular spring washer 132 which engages adjacent its inner periphery a ring 134 that is positioned between the rings 88 and 100. Ring 134 is provided with a shoulder 136 which projects radially outwardly between the ring 90 and the part-ring 108. Between the ring 134 and the outer ring 90 of the above lying bearing one or more shim washers 138 may be mounted. The cup spring or spring washer 132 is preferably pretensioned so as normally to be bent at its outer periphery towards the shoulder 136. When the balls 128 move the part-rings 108, 110 axially, the spring washer 132 can be bent into engagement with the shoulder 136.

A sleeve-shaped ball cage 140 projects from the bearing rings 100, 108 and 110 and is provided with openings 148 for the balls 112. The cage 140 has a downwardly directed projection 142 to which an arm 144 is connected. The arm 144 extends radially outside the apparatus and is adapted in a conventional manner to be fixed against rotation to maintain the cage 140 and thus also the balls 112 stationary, so that the balls only rotate about their own centers, and do not revolve about the axis of the thread cutting apparatus during its operation.

The openings in the cage 140 for the balls 112 are preferably displaced alternatingly in opposite directions from the symmetrical plane 146 of the bearing, as best seen in FIG. 3. According to this figure, the openings $148^1$ and $148^2$ are displaced upwards in relationship to their balls $112^1$ and $112^2$, while the opening $148^3$ located between said openings is displaced towards the opposite sides of the symmetrical plane 146 in relation to the ball $112^3$.

A chamber 154, which is closed by a washer 150 and a locking ring 152, but which opens inwardly, contains a sealing material impregnated with a lubricant.

The apparatus operates in the following way.

In direct drive the various parts of the apparatus assume the position shown in FIG. 1. The driving torque is transmitted from the spindle 12 to the part 10, the spring loaded balls 36, the coupling element 38, the sleeve 58, the balls 70 and to the driven part 46. The screw tap carried by the latter performs a screw cutting operation. When this operation is completed the resistance can become so great that the driving connection between the parts 36 and 38 of the detent coupling is interrupted. The balls 36 now rotate together with the part 10 in relation to the stationary sleeve element 38 and as a consequence they jump in a snapping movement into and across the recesses 40 of said element. The spring members 34 determine the maximal torque which is transmitted by the detent couplings 36, 38 and which is adjusted so as to keep stressing of the detent coupling during the idling motion at a minimum. When the driving part 10 is moved upwards by the operator, the various elements of the apparatus are brought along except the drive part 46, which means that the sleeve 58 is switched to its other limit position according to the above description, in which position the ball 78 enters the lower groove 86. A driving connection is now established between the reversing sleeve 102 and the sleeve 58 in lieu of, as in the direct drive, between said sleeve 58 and the sleeve element 38. The driving torque from the spindle 12 will now pass through the part 10, the ring 122 rigidly secured to said part 10, the balls 128, the part-ring 110, the balls 112, the inner bearing ring 100, the sleeve 102, the dogs 60, the sleeve 58, the balls 70 and to the driven part 46. The screw tap offers a greater or smaller resistance to the reversing movement and thereby a variable torque is produced to act on the coupling between the rings 122 and 110. The ring 122 performs a rotational movement in relationship to the part-ring 110, which has as a consequence that the balls 128 roll laterally from their centre position in the recesses 124, 126, shown in FIG. 3, and cause the part-ring 110 to be pressed upwards. The pressure on the balls 112 created hereby is transmitted axially to the part-ring 108 which is likewise displaced upwards while tensioning the spring washer 132. The spring washer will engage the shoulder 136 on the intermediate ring 134 when the axial pressure becomes large enough. This causes an increased radial jamming force between the balls 112 and the rings co-acting therewith and the reversing device obtaining an increased capability of transmitting torque between the driving and the driven parts of the apparatus. Thus the reversing device is adjusted automatically in accordance with the magnitude of the driving torque required for screwing out the tap from the finished hole.

The outer part-rings 108, 110 in the reversing device is pre-tensioned with a force which is comparatively small and whose magnitude may be adjusted by means of one or more shim washers 138. By using a flat spring washer 132 co-operating with the flat ring 134 it is ensured that the ball bearing component of the reversing device will lie with its raceways perpendicular to the axis of rotation with deviations which are very small in comparison with those which would occur if the pre-tension were to be carried out by means of conventional cup springs or the like means. When the load on the reversing device increases above a predetermined level the tensionsing results in a pure abutment without causing the spring washer 132 to be stressed too severely.

Since the axial pressure against the reversing bearing merely acts on the parted outer rings 108, 110, thus not passing through the inner ring 100, no special thrust bearing for the transmission of forces is necessary. The axial pressure acting on the balls 112 is thus transmitted between parts which are all connected to the part 10 which is the driving part in the illustrated embodiment, which parts include the locking ring 122, the balls 128, the part-rings 108, 110, the spring washer 132, the intermediate ring 134, the shim washer 138 and the outer bearing ring 90 which in turn bears against the shoulder 96 in the part 10.

As is easily understood, the outer and inner rings of the reversing bearing rotate in opposite directions, the inner ring 100 even having a greater speed than the parted outer rings 108, 110, which causes the relative speed between the rings to be very high. Since according to the invention the axial forces need not be transmitted between bearing parts rotating in opposite directions the operation temperature of the bearing becomes low. This advantage is partly also gained by the absence of a separate thrust bearing for applying the reversing device.

The upper part-ring 108 serves as in a radial ball bearing and centers the inner ring 100. The lower part-ring 110 has been made void of radial guidance and thus is readily movable peripherally. Since the inertia and the frictional breaking force against the surrounding elements is small, application can be effected without disturbances even at high speeds.

As a matter of fact, during reverse operation the balls 112 are maintained stationary in relationship to the axis of the thread cutting apparatus by means of the ball cage 140. Of course, the balls 112 then exert a pressure against the ball cage. As the openings 148 in the ball cage are alternatingly displaced transversely to the symmetrical plane 146, the balls will engage the cage under a predetermined angle, such as 75°, for example, to said plane. Thus in FIG. 3 it is assumed that the balls $112^1$ and $112^2$ engage the walls of the openings at points $156^1$ and $156^2$, while the intermediate balls engage the wall of the opening in the opposite direction, that is, at point $156^3$. To begin with the result will be that the ball cage 140 and the arm 144 become better stabilized and thus free from vibrations which otherwise would occur on account of the fact that the ball cage is freely suspended.

Of course the pressure between the balls 112 and the ball cage 140 causes at the same time a change of the points of engagement of the balls against the outer and inner ring of the reversing bearing. The balls are displaced axially transversely to the symmetrical plane 146 so that every second ball will have its point of engagement against the inner ring 100 located below the symmetrical plane 146 according to FIG. 2, and the remaining balls will have their points of engagement located above said plane. In the same manner the balls are displaced to alternatingly engage the lower and upper part-ring 110 and 108. The construction of the ball cage 140 will then have the same effect as that of the coupling between the rings 110, 122, as the balls 112 create a variable axial pressure against the inner and outer rings of the reversing bearing in accordance with the magnitude of the torque to be transmitted. It will easily be understood that the pressure between the balls 112 and the ball cage 140 will grow with the torque which the threaded apparatus is to transmit. The angle across which the balls are displaced as their points of engagement are moved to the positions 156, changes with the driving torque within the scope of the elasticity of the bearing rings, the ball cages and the pre-tensioning elements. If the number of balls 112 effective in either direction is the same no remaining axial component will arise to act either on the inner ring or on the outer ring.

In some cases it is possible, at least at lower speeds, to generate the variable, automatic application merely by means of a ball cage constructed according to the above description, in which case the two rings of the reversing bearing may be made all in one piece. From the standpoint of assembly the ball cage 140 may instead be formed parted along the symmetrical plane 146, for instance, or it may have grooves extending from the edge of the cage, so that the cage may be introduced over the balls 112, the latter being received in the grooves.

The embodiment according to FIG. 4, wherein the same reference characters apply to parts equivalent to parts of the preceding embodiment, differs from the latter substantially by the feature that the part-rings 108, 110 of the reversing bearing have changed places. Thus the part-ring 110, which simultaneously forms a part of the wedge coupling, has been positioned adjacent the upper bearing, whose outer ring 90 has been locked to part 10 by means of a lock pin 158 which extends into a groove 160 formed in said ring. The outer ring 90 is provided with wedge-shaped recesses 124, and the balls 128 of the wedge coupling co-operate with these recesses and with the recesses 126 of the part-ring 110. As in the previous embodiment the part-ring 108 is centered by the cylindrical internal face 120 of the driving part 10. The axial position of the part-ring 108 is fixed by a locking washer 162. One or more shim washers 138 may be placed between the part-ring and the locking washer.

Within the reversing bearing the inner ring 100 may be parted instead of the outer ring for co-operation with a coupling 124, 126, 128. The openings 148 in the ball cage 140 need not be circular, but may be shaped otherwise in order to attain the automatic axial climbing of the balls 112 in opposite directions in dependence on the magnitude of the driving torque at the reversing operation. The pre-tension of the reversing bearing may be controlled in several ways, for instance, radially by pressure introduced between the bearing rings and the rolling bodies 112. By its construction the ball bearing cage also effects pre-tensioning. It is therefore possible to construct the reversing device without any axially resilient members, as shown in the embodiment according to FIG. 4.

Likewise the reversing bearing may be varied in several ways. The rolling bodies may have conical, double conical, elliptical, cylindrical forms etc. Then the raceways need not be cup-shaped but may be conformed to the rolling bodies. Furthermore, the shape of the rolling body cage should conform to the construction of the reversing bearing. In addition, the reversing bearing may have more than one ring with rolling bodies, which is necessary in some of the enumerated cases.

The wedge coupling may be constructed with wedges instead of rolling bodies 128. Only one of the rings cooperating with the rolling bodies etc. need be provided with singly or doubly inclined recesses.

While several more or less specific embodiments of the invention have been shown and described, it is to be understood that this is for purpose of illustration only and that the invention is not to be limited thereby, but its scope is to be determined by the appended claims.

What I claim is:

1. A device for use in an apparatus of the type including screw thread cutting apparatus, comprising a driving part, a rotatable part driven by said driving part in either direction, ring members carried by said parts for selectively reversing the direction of rotation of said driven part, a pair of raceways formed on said ring members and facing one another, a plurality of torque transmitting rolling bodies mounted in said raceways, one of said ring members comprising two separate part-rings mounted coaxially of one another and together forming at least one of said raceways, a holder member for maintaining said torque transmitting bodies against rotation about the axis of the driven part, means to generate a variable pressure in response to the magnitude of the reversing torque to press said torque transmitting bodies against said raceways, and means operable by relative axial movement between said part-rings for yieldably accommodating said variable pressure without transmitting it axially between said ring members.

2. In a device as claimed in claim 1, wherein the means for creating the variable pressure comprises a wedge coupling participating in the torque transmission and adapted to displace at least one of said ring members axially in correspondence to the torque requirement.

3. In a device as claimed in claim 2, wherein said wedge coupling comprises a further member connected to said driving part in axially spaced confronting relation to said one ring member, and a plurality of rolling bodies disposed between rolling ways having inclined walls on said confronting members.

4. In a device as claimed in claim 2 wherein said driving part comprises a cylindrical member surrounding said ring members, one of said ring members is disposed radially within the other, the outer ring member is parted, and the part-ring initially subjected to the axial pressure and is mounted with a radial clearance in relation to the surrounding driving part.

5. In a device as claimed in claim 4, wherein the other part-ring is centered in the driving part and is adapted to center the inner ring member by way of the rolling bodies.

6. In a device as claimed in claim 1, wherein means is provided for causing the part-rings to engage the rolling bodies under a pre-tension.

7. In a device as claimed in claim 6, wherein the means creating said pre-tension comprises a resilient element.

8. In a device as claimed in claim 6, wherein the means creating said pre-tension comprises a flat spring washer, and means to limit the flexing of said washer in an axial direction.

9. A device for use in an apparatus of the type including screw thread cutting apparatus, comprising a rotatable driving part, a rotatable part driven by said driving part selectively in both directions, ring members carried by said parts for selectively reversing the direction of rotation of said driven part, a pair of raceways formed on said ring members and facing one another, an annular holder member mounted between said raceways and having therein a plurality of spaced apertures, the centers of adjacent apertures being offset in opposite directions from a symmetrical plane perpendicular to the axis of said driven part, a plurality of reverse torque transmitting balls mounted in said apertures between and in engagement with said raceways, means for holding said holder stationary, and means operative in response to the magnitude of the reversing torque to vary the pressure between said balls and said raceways, said apertures being larger than said balls thereby to cause adjacent bearings to be displaced to opposite sides of said plane in relation to said raceways and in proportion to the magnitude of the reversing torque, and said raceways having in cross-section a slightly larger radius of curvature than said balls.

References Cited by the Examiner

UNITED STATES PATENTS

| 2,795,146 | 6/57 | Alfredeen | 74—205 |
| 3,037,393 | 6/62 | Bernhard | 74—205 |
| 3,041,893 | 7/62 | Johnson | 74—202 |

DON A. WAITE, *Primary Examiner.*